United States Patent [19]

Kosak et al.

[11] 4,134,038

[45] Jan. 9, 1979

[54] SPEED CONTROL FOR A UNIVERSAL ELECTRIC MOTOR

[75] Inventors: Wolfgang Kosak, Möglingen; Peter Werner, Stuttgart, both of Germany; Hans Gerber, Luterbach; Ivan Hidveghy, Zuchwil, both of Switzerland

[73] Assignee: Robert Bosch GmbH, Stuttgart, Germany

[21] Appl. No.: 869,611

[22] Filed: Jan. 16, 1978

[30] Foreign Application Priority Data

Jan. 20, 1977 [DE] Fed. Rep. of Germany ....... 2702142

[51] Int. Cl.² ............................................. H02P 5/40
[52] U.S. Cl. .................................... 318/245; 318/332; 318/812
[58] Field of Search ............... 318/227, 230, 245, 332, 318/345 C, 345 G

[56] References Cited

U.S. PATENT DOCUMENTS

| 3,366,861 | 1/1968 | Dudler | 318/227 |
| 3,399,333 | 8/1968 | Canter | 318/227 |
| 3,596,158 | 7/1971 | Watrous | 318/230 X |

Primary Examiner—Gene Z. Rubinson
Attorney, Agent, or Firm—Flynn & Frishauf

[57] ABSTRACT

A first thyristor, under control of a speed setting provided in an RC circuit varies the phase duration of current supply to the motor during positive halfwaves of the a c supply, and a second thyristor controlled in accordance with the motor current provided through the first thyristor determines the phase angle during which current flows through the motor in the negative halfwave of the voltage supply, so as to maintain the speed at the set value under varying conditions of load. During positive halfwaves, a capacitor is charged to a voltage corresponding to the amount of current flow through the motor and during the following negative halfwave, the charge is increased at a rate set by an RC circuit, resulting in turning on the second thyristor early under heavy load conditions, and late under light load conditions, and indeed not at all under idling conditions.

9 Claims, 2 Drawing Figures

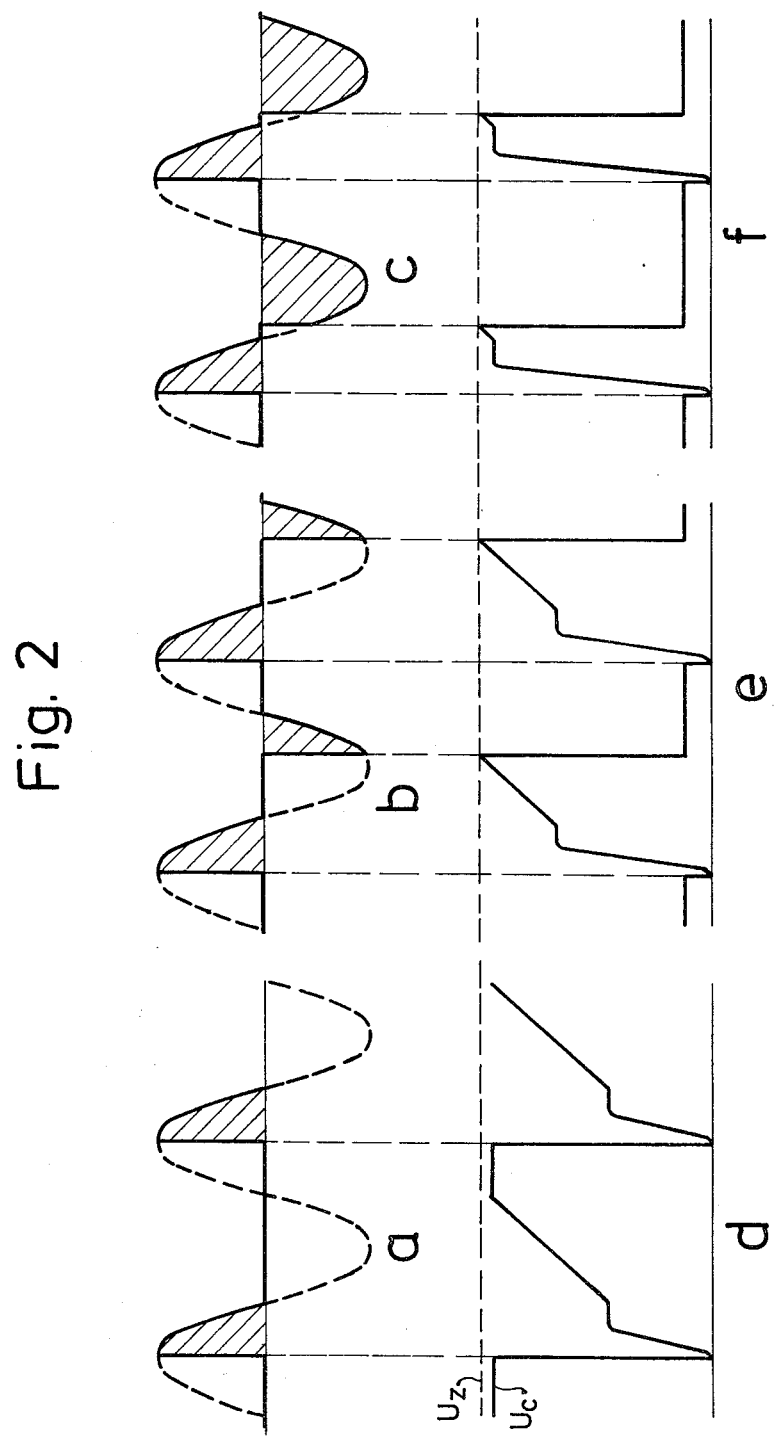

SPEED CONTROL FOR A UNIVERSAL ELECTRIC MOTOR

This invention concerns a speed control for a universal motor, particularly for motors of the kind used in electrically driven tools operated from generally available alternating current power.

Conventional electric motor speed control using controllable semiconductor devices and an RC network including a variable resistance providing speed control by determining at what phase of the alternating current each current pulse used by the motor will begin operate on only one halfwave of the a c cycle of the alternating current supply power. This kind of speed control obtains some regulation of the speed set by the setting of the variable resistor as a result of the counter-EMF produced in the armature of the universal motor. There is the disadvantage in these known speed controls, however, that the regulation effect just described is relatively small, so that the speed drops down with increasing loading of the universal-wound motor more steeply than would be desirable. In other known types of speed controls, on the other hand, that are designed to keep up the speed under load, there is lacking an effective way to limit the idling speed of the motor. This is particularly critical for universal motors of relatively high power rating, for example 450 watts, since such motors without speed limiting reach such high idle running speeds that they produce unacceptable levels of noise and are subject to high wear of their bearings and deformation of the collector contacts. For these reasons, they require a limiting of the idling speed.

The Present Invention

It is an object of the present invention to provide a speed control of the phase switching type using at least one controllable semiconductor device which will provide regulation of the speed of a universal electric motor operating on a c consistent with the setting of the speed control over a wide range of load.

Briefly, a second controllable semiconductor device is connected with its switching path in parallel with and oppositely poled to the switching path of the on which the speed control provided by a variable RC network and a first semiconductor threshold switch directly operates. The control circuit of the second controllable semiconductor device is coupled inductively with the load circuit of the first controllable semiconductor device, preferably by a transformer, and includes a capacitor connected so as to be charged in each a c cycle to a voltage dependent upon the magnitude of current in the load circuit of the first controllable semiconductor device, thus the motor current. The control circuit of the second controllable semiconductor device also includes a second semiconductor threshold switch in a circuit arranged for further charging the capacitor with a predetermined time constant of charging towards the ignition voltage necessary to make the second controllable semiconductor threshold switch conducting, so that its ignition voltage is reached at a moment the timing of which is dependent upon the load circuit current and turning on the second controllable semiconductor device at such times as to provide motor speed regulation consistent with the setting provided by a variable resistor in the RC circuit just mentioned. For assuring stable operation of the control circuit of the second controllable semiconductor device, a discharging circuit is provided for the capacitor located therein to discharge it to a defined voltage at the beginning of each work cycle, preferably utilizing a differentiating network to derive discharge trigger pulses upon each switching on of the first controllable semiconductor device that is directly controlled by the manually settable RC circuit.

The controllable semiconductor devices in series with the motor are preferably semiconductor controlled rectifiers. Semiconductor controlled rectifiers are generally referred to as SCR's or "thyristors". The latter term is used hereinafter to refer to such devices as a matter of convenience of expression. A thyristor is preferably also used in the discharging circuit of the capacitor above mentioned, connected with its switched path in parallel with the capacitor, so that the capacitor will be short-circuited when the thyristor is turned on (ignited).

In order to stabilize the input voltage of the first semiconductor threshold switch in the control circuit of the first thyristor against fluctuations of the supply voltage, it is preferred to include a Zener diode in the control circuit of the first thyristor (the one that is directly controlled by the variable RC circuit).

DRAWINGS, ILLUSTRATING AN EXAMPLE.

The invention is further described by way of example with reference to the annexed drawings, in which:

FIG. 1 is a basic circuit diagram of a motor speed control circuit embodying the invention, and FIG. 2 is a comparative graphical representation of three sets of curves illustrating the course of the voltage with time at two different points of the circuit of FIG. 1 for three different operating conditions.

DESCRIPTION OF THE PREFERRED EMBODIMENT.

Figure 1:
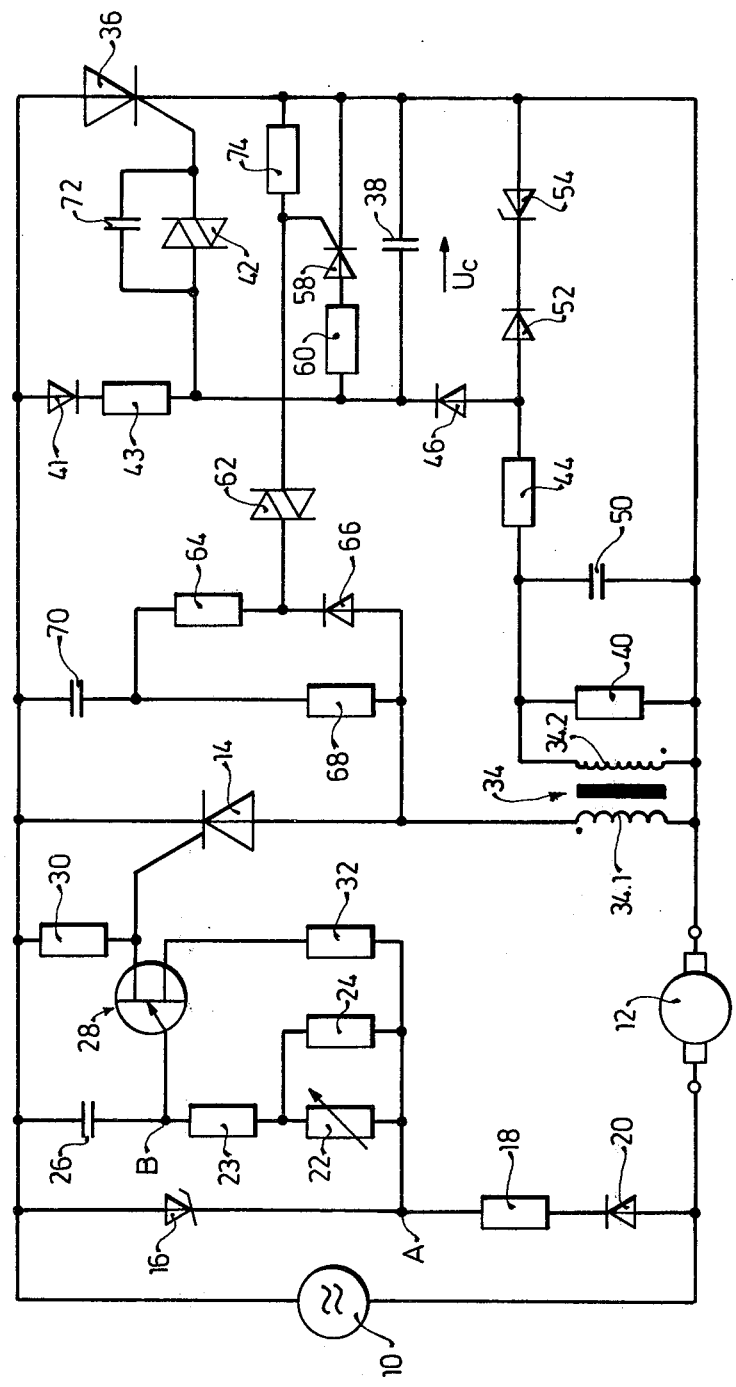

As shown in FIG. 1, the speed control circuit is connected to an alternating current source 10 that normally is the usual electric power wiring. The circuit shown is usable at the European standard voltage and frequency, namely 220 volts and 50 Hertz, and in consequence, the same basic circuit is also readily usable as the North American standard of 115 volts and 60 Hertz and can also be adapted to 230 volts, 60 Hertz, if desired.

A universal motor 12 with a series circuit collector is powered by the alternating current source 10. The motor 12 is connected in series with a first thyristor 14 and the primary winding of a transformer 34, the purpose of which will be mentioned below, this series combination being between the terminals of the a c source 10. For control of the first thyristor 14, a control circuit is provided having a first branch composed of the series connection of a Zener diode 16, a resistance 18 and a diode 20. When the voltage is such that the diode 20 is poled in its conducting direction, for example during the positive halfwave of the a c voltage, current flows in the circuit branch 16, 18, 20. The Zener diode 16 limits to a predetermined value the voltage at its common connection A with the resistance 18. The connection point A is also connected back to the other terminal of the Zener diode 16, which is to say with the a c voltage source 10, over a series combination of a variable resistance 22, a resistance 23 and a capacitor 26. The variable resistance 22 may be, as a practical matter, constructed as a potentiometer and used as a rheostat (i.e. as a two-terminal device). Another resistance 24 is provided in parallel with the variable resistance 22 for limiting the resistance of the parallel combination 22, 24 to a value such that the phase angle at which the motor is cut in will not be less than a predetermined minimum value.

At the common connection point B of the capacitor 26 and the resistance 23, there is connected also the control electrode of a first semiconductor threshold switch, in the illustrated case provided in the form of a unijunction transistor 28. One of the base terminals of the unijunction transistor 28 is connected directly with the control electrode of the first thyristor 14 and also to a resistance 30 of which the other end is connected to the side of the a c power line to which the capacitor 26 and the first thyristor 14 are directly connected. The other base connection of the unijunction transistor 28 is connected through a resistance 32 with the previously mentioned connection point A. By the stabilization of the input voltage for the unijunction transistor 28 provided by the Zener diode 16, a wide range of independence from fluctuations of the power supply voltage is obtained for the speed control of the motor.

The time interval that is necessary after the beginning of a positive halfwave for reaching the necessary switching voltage for the unijunction transistor 28 at the connection point B is, for a given Zener voltage across the Zener diode 16 and for given resistance values of the fixed resistors 23 and 24, on which the interval is also dependent, set by the position of the variable resistor 22. Thus this variable resistor 22 provides control of the speed of the motor 12.

As already mentioned, in the circuit of FIG. 1, a transformer 34 is provided having a primary winding 34.1 in the load circuit of the first transistor 14. The secondary winding 34.2 of the transformer 34 lies in the control circuit of a speed regulation arrangement that will now be further described.

In the speed regulation circuit of the speed control of the present invention, a second thyristor 36 is provided that is connected in parallel with and poled opposite to the first thyristor 14, so that the second thyristor 36 is in series with the motor 12 across the alternating current source 10, but with polarity opposite to that of the first thyristor 14. Thus, if the first thyristor 14 is made conducting during a portion of each positive halfwave, the second thyristor 36 will likewise operate by the cut-in phase control system.

In the illustrated circuit, when current flows through the primary winding 34.1 of the transformer 34, a corresponding voltage is produced across the secondary winding 34.2 of this transformer by which an ignition capacitor 38 is charged to the voltage corresponding to the peak value of the motor current during the conduction period of the first thyristor 14, the provision of this peak voltage operating as feedback voltage. Starting then at this feedback voltage, the ignition capacitor 38 is further charged during the next negative halfwave until it reaches the ignition voltage of a trigger diode 42 in the control circuit of the second thyristor 36. The second thyristor 36 is thus switched on during each negative halfwave at a time that is the earlier, the higher the motor current is during the previous positive halfwave, i.e. the higher the loading of the motor 12 is (it will be pointed out presently that at very light load, the thyristor 36 may not be switched on at all).

In the illustrated circuit, the charging of the capacitor 38 during the negative halfwave is produced through a diode 41 and a resistance 43 connected in series therewith. Furthermore, the secondary winding 34.2 of the transformer 34 is not directly connected to the capacitor 38, but rather through the series connection of a resistor 44 and a diode 46. The transformer is bridged on the secondary side with a resistor 40. The capacitor 50 connected in parallel therewith serves for smoothing and for suppression of disturbance pulses. The terminal of the diode 46 that is not connected to the capacitor 38 is also connected to the series connection of a diode 52 and a Zener diode 54 going over to the other terminal of the capacitor 38 in order to prevent the reaching of the ignition voltage of the trigger diode 42 in the course of a positive load wave under a load condition that is greater than the design load.

In order that the voltage across the ignition capacitor 38 at the beginning of each halfwave, which is to say at the beginning of each regulation operation, should have a definite initial value, namely substantially zero voltage, the speed control of the present invention includes a discharge or extinction circuit utilizing an auxiliary thyristor 58 that is connected in series with the resistance 60, the series combination being across the capacitor 38. The control electrode of the auxiliary thyristor 58 is connected with the output of a threshold switch provided in the form of a trigger diode 62. The input of the trigger diode 62 is connected to the common connection of a resistor 64 and a diode 66, these two last-mentioned components 64,66 being connected in parallel with another resistance 68 that is part of a circuit branch including, in series, the capacitor 70, which branch is connected in parallel with the switched path of the first thyristor 14. When it is switched on by its control circuit, the resulting voltage step is differentiated by the RC network 68, 70 with the result that the ignition voltage of the trigger diode 62 is reached and thereupon the auxiliary thyristor 58 is made conducting. The resistance 60 connected in series with the auxiliary thyristor 58 is of relatively low ohm value, so that the ignition capacitor 38 is practically fully discharged by the switching on of the auxiliary thyristor 58. As soon as the voltage across the ignition capacitor 38 has been sufficiently reduced, the thyristor 58 becomes nonconducting again, so that the renewed charging-up of the ignition capacitor 38 can later proceed to a voltage corresponding to the peak value of the current through the first transistor 14 and hence through the motor 12 also. Furthermore, the commutation transient peaks produced by the cutting off of the motor current can be limited to values of, for example, about 8 volts, by suitable dimensioning of the resistance 68 and the capacitor 70 that together constitute a storage and dissipation circuit, so that the voltage peaks will not ignite the trigger diode 62, that has a threshold of about 32 volts. By the capacitor 72, connected in parallel with the trigger diode 42, the trigger diode 42 is also protected against high-frequency disturbance pulses. It should finally be mentioned also that the control electrode of the auxiliary thyristor 58 is connected through a resistor 74 with the common connection of the auxiliary thyristor 58 and the ignition capacitor 38.

The protection of the trigger diode 42 against disturbance pulses during the duration of the positive halfwaves can also be obtained by connecting a transistor and a discharging resistor (not shown) in series with the trigger diode 42, the transistor in this case (not shown) being unblocked only during the negative halfwave, so that ignition pulses for the second thyristor 36 cannot take place during the positive halfwaves of the alternating voltage.

Operation of the illustrated circuit

FIG. 2 shows particularly clearly how the embodiment of the invention illustrated in FIG. 1 operates. The curves a, b and c of FIG. 2 show the voltage present at the motor 12 under three different operating conditions, and the curves d, e and f show the corresponding voltage across the ignition capacitor 38 under these three operating conditions.

In particular, the curves a and b hold for the idling operation of the motor idling, curves b and e for normal operation at which the speed is regulated at a particular setting, and the curves c and f for the case in which the motor is operating at rate full load. It is clear from FIG. 2 that in all three operating conditions, current flowing during the positive halfwave the leads to the provision of a voltage across the ignition capacitor 38 — this voltage is designated $U_c$ — that rises to a certain level and then remains at this level until the end of the positive halfwave. The level of the voltage $U_c$ reached at the end of the positive halfwave is different in the case of idling, partial load and full rate of load and reaches the highest value at full rate of load, while its lowest value is reached in the idling condition.

Starting from the level reached during the course of the positive halfwave, the voltage $U_c$ across the ignition capacitor 38 then rises during the following negative halfwave and approaches thus the ignition voltage $U_z$ for the trigger diode 42. As FIG. 2 shows, this ignition voltage $U_z$ is not reached at all in the idling condition, since here the motor current during the positive halfwave is small and consequently the voltage across the ignition capacitor 38 only reaches a relatively low level. This has the consequence that in idling operation of the motor 12, the second thyristor 36 remains blocked during the entire negative halfwave. Under partial load, on the other hand, a relatively high level of the voltage $U_c$ across the capacitor 38 is reached already during the positive halfwave, so that the thyristor 36 will be turned on during a part of the following negative halfwave, after the ignition voltage $U_z$ of the trigger diode 42 is reached.

In the third illustrated condition, full rated load, the level of the voltage $U_c$ across the ignition capacitor 38 reached during the positive halfwave is so high that only a small additional charging of the capacitor 38 is needed to reach the ignition voltage $U_z$ during the negative halfwave, so that the thyristor 36 is already turned on shortly after the beginning of the negative halfwave. It is clear from FIG. 2 that in the speed control of the present invention, for a given firing angle α in the speed control circuit, the average current flow through the motor 12 is regulated in dependence on the load within wide ranges. The firing angle α itself is set in the speed control circuit by corresponding setting of the variable resistor 22. The resistance combination 22, 23 and 24 is so designed that by setting of the variable resistor 22 for speed zero, there will always be a certain minimum firing angle α for the thyristor 14 of the speed control circuit. In this manner, it is assured that the discharging circuit will produce a discharge of the ignition capacitor 38 at the end of every positive halfwave. On the other hand, the minimum firing angle α is kept so small that the motor 12 does not start up. This result can be obtained, for example, with a firing angle of about 40°.

It should also be mentioned that the trigger diodes 42 and 62 are preferably constituted as diacs and that, furthermore, instead of the unijunction transistor 28, a diac can also be provided there to obtain the advantages of the invention.

The speed control of the present invention has the advantage that the limiting of the idling speed is effectively provided, a stepless speed setting is obtained that extends all the way from speed zero to full speed, and an outstanding quality of speed stabilization and regulation is obtained. The two thyristors connected anti-parallel to each other with their separate control circuits in effect provide a first circuit for speed control and limiting and a second circuit for regulation of the speed to the set value. An unsymmetrical cut-in phase control is thus produced. The setting of the speed in the control circuit of one thyristor by the change of cut-in phase is produced by an RC phase shifter, so that a continuous control of the speed up to a prescribed maximum idling speed is possible, in which control one halfwave of the power voltage, for example, the positive halfwave, is chopped. Then for the regulation circuit which contains the second thyristor that is effective during each second halfwave of the power voltage, thus for example during the negative halfwave, an inductively coupled feedback signal is used which is dependent on the current in the load circuit of the first thyristor, which is to say from the motor current, thus utilizing the fact that the motor current, for any cut-in phase angle set by the speed control circuit varies only in dependence upon the loading of the motor.

Although the invention has been described with reference to a particular illustrative embodiment, it will be understood, as already mentioned in a few respects, variations and modifications are possible within the inventive concept.

We claim:

1. A speed control for a universal a c electric motor comprising:

a first controllable semiconductor device (14) in series with the motor having a control circuit and having a load circuit including inductive coupling means (34) as well as said motor (12);

a first semiconductor threshold switch (28) and also a variable RC network in the control circuit of said first threshold switch, said RC network including a variable resistance (22) for setting the time constant of said control circuit on the input side of said threshold switch (28) and thereby varying the speed of said motor;

a second controllable semiconductor device (36) in parallel with and oppositely poled to said first controllable semiconductor device (14) and having a control circuit coupled inductively by said coupling means (34) with said load circuit of said first controllable semiconductor device (14), said control circuit of said second controllable semiconductor device (36) including a capacitor (38) connected so as to be charged in each a c cycle to a voltage dependent upon the magnitude of current in said load circuit of said first controllable semiconductor device (14), and a second semiconductor threshold switch (42) in the control circuit of said second controllable semiconductor device (36) and means (41,43-54) also in said control circuit of said second controllable semiconductor device (36) interconnecting said second semiconductor threshold switch (42) and said capacitor (38) for further charging said capacitor (38), with a predetermined time constant of charging, towards the ignition voltage ($U_z$) necessary to make said second semiconductor threshold switch (42) conducting, thereby causing said ignition voltage to be reached and said second controllable semiconductor device (36) also to be made conducting at moments the timing of which is dependent upon the magnitude of said current in said load circuit for consequently providing motor speed regulation consistent with a speed setting provided by said variable resistor (22).

2. A speed control for an electric motor as defined in claim 1, comprising also a discharging circuit 58–60 for said capacitor (38) by means of which said capacitor (38) is dischargeable to a definite voltage at the beginning of each work cycle of said capacitor.

3. A speed control for an electric motor as defined in claim 1, in which each of said controllable semiconductor devices (14,36) is a thyristor.

4. A speed control for an electric motor as defined in claim 2, in which each of said controllable semiconductor devices (14,36) is a thyristor.

5. A speed control for an electric motor as defined in claim 2, in which said discharging circuits (58–70) include an auxiliary thyristor (58) having its switched path connected in parallel to said capacitor (38).

6. A speed control for an electric motor as defined in claim 2, in which said discharging circuit includes a differentiating network (68,70) for producing a discharge trigger pulse in response to each switching over of said first controllable semiconductor device (14) into the conducting condition.

7. A speed control for an electric motor as defined in claim 5, in which said discharging circuit includes a differentiating network (68,70) for producing a discharge trigger pulse in response to each switching over of said first controllable semiconductor device (14) into the conducting condition.

8. A speed control for an electric motor as defined in claim 1, in which said inductive coupling means (34) is constituted by a transformer having a primary winding in series with said motor and said first controllable semiconductor device and a secondary winding (34.2) connected so that from one of its terminal a potential is obtainable for reaching the said ignition voltage ($U_z$) necessary to make said second semiconductor threshold switch (42) conducting.

9. A speed control for an electric motor as defined in claim 1, in which said control circuit of said first controllable semiconductor device (14) includes a Zener diode (16) for stabilizing the input voltage of said first semiconductor threshold switch (28) against fluctuations of the supply voltage by which said motor and said speed control are energized.

* * * * *